United States Patent [19]

Yoshimura

[11] Patent Number: 4,989,997
[45] Date of Patent: Feb. 5, 1991

[54] RADIAL LOAD REDUCING DEVICE, AND SLIDING BEARING AND SCREW COMPRESSOR USING THE DEVICE

[75] Inventor: Shoji Yoshimura, Kakogawa, Japan

[73] Assignee: Kabushiki Kaisha Kobe Seiko Sho, Kobe, Japan

[21] Appl. No.: 473,407

[22] Filed: Feb. 1, 1990

[30] Foreign Application Priority Data

Jul. 28, 1989 [JP] Japan ................................. 1-197492

[51] Int. Cl.$^5$ ............................................. F16C 32/06
[52] U.S. Cl. .................................... 384/100; 384/101; 384/118
[58] Field of Search ............... 384/101, 102, 114, 116, 384/118, 126

[56] References Cited

U.S. PATENT DOCUMENTS 3,909,081  9/1975  Wilcock et al. ...................... 384/101
4,227,755  10/1980  Lundberg ........................ 384/101 X
4,310,203  1/1982  Eickmann ........................... 384/118
4,371,216  2/1983  Suzuki ................................. 384/118

Primary Examiner—Thomas R. Hannon
Attorney, Agent, or Firm—Oblon, Spivak, McClelland, Maier & Neustadt

[57] ABSTRACT

A radial load reducing device includes a high-pressure fluid chamber defined to face an outer circumferential portion of a rotating shaft or an outer circumferential portion of a rotating body integrally rotating with the rotating shaft at a first position where a radial load to be applied to the rotating shaft is directed, and a low-pressure fluid chamber defined to face the outer circumferential portion at a second position opposite to the first position. Further, a sliding bearing and a screw compressor using the above device are also provided. The fluid pressure in the high-pressure fluid chamber is applied in a direction counter to the direction of application of the radial load to be applied to the rotating shaft, thereby reducing the radial load to be applied to the rotating shaft.

9 Claims, 4 Drawing Sheets

RADIAL LOAD REDUCING DEVICE, AND SLIDING BEARING AND SCREW COMPRESSOR USING THE DEVICE

BACKGROUND OF THE INVENTION

The present invention relates to a radial load reducing device for reducing a radial load to be applied to a rotating shaft, and also relates to a sliding bearing and a screw compressor using the same.

In case of a screw compressor for example, a rotor shaft receives a large thrust load and radial load from a high-pressure side to a low-pressure side because of a compressed gas enclosed by a screw rotor. Accordingly, the rotor shaft is supported by a thrust bearing and a radial bearing.

The life of such bearings decreases with an increase in such loads to be applied to the bearings.

There has been proposed a device for reducing the thrust load to be applied to the rotor shaft of the screw compressor and thereby extending the life of the thrust bearing (Japanese Patent Publication No. 48-33041 and Japanese Patent Laid-open Publication No. 57-153986).

However, any measures for reducing the radial load to be applied to the radial bearing has not yet been practically applied at present.

The operation of the screw compressor is limited depending upon the life of the radial bearing, and any screw compressor at present cannot be operated under a high-pressure greater than a given discharge pressure. Thus, it is greatly demanded to expand an applicable pressure range of the screw compressor.

SUMMARY OF THE INVENTION

It is an object of the present invention to provide a radial load reducing device and a sliding bearing and a screw compressor using the device which may reduce the radial load.

According to a first feature of the invention, there is provided a radial load reducing device comprising a high-pressure fluid chamber defined to face an outer circumferential portion of a rotating shaft or an outer circumferential portion of a rotating body integrally rotating with said rotating shaft at a first position where a radial load to be applied to said rotating shaft is directed, and a low-pressure fluid chamber defined to face said outer circumferential portion at a second position opposite to said first position.

According to second and third feature of the invention, there are respectively provided a sliding bearing and a screw compressor formed by using the device according to the first invention.

In all of the first, second and third features inventions, the fluid pressure is applied to the rotating shaft in a direction counter to the direction of application of the radial load, thereby reducing the radial load to be applied to a radial bearing.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of the present invention with reference to the drawings.

Figure 1:
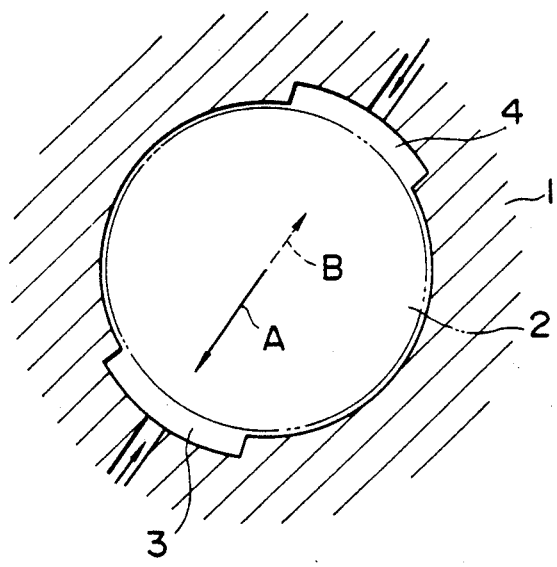
FIG. 1 is a sectional view of the device according to the first feature of the invention.

FIG. 1 shows a radial load reducing device 1 according to the invention applied to a rotating shaft 2.

A radial load is applied to the rotating shaft 2 in a direction depicted by a solid arrow A. A high-pressure fluid chamber 3 is defined in a stationary housing to face an outer circumferential portion of the rotating shaft 2 at a position indicated by the arrow A, and a low-pressure fluid chamber 4 is defined in the stationary housing to face an outer circumferential portion of the rotating shaft 2 at a position radially opposite and axially aligned with the high pressure fluid chambers, as indicated by the arrow A. Thus, the radial load reducing device 1 is formed by the high-pressure fluid chamber 3 and the low-pressure fluid chamber 4.

The high-pressure fluid chamber 3 is filled with a pressure fluid such as oil or air having a suitable pressure, and the low-pressure fluid chamber 4 is filled with a pressure fluid having a pressure lower than that in the high-pressure fluid chamber 3, so that a force may be applied to the rotating shaft 2 in a direction as depicted by a dotted arrow B counter to the solid arrow A. Thus, the radial load to be applied to the rotating shaft 2 can be reduced by the device 1.

A radial bearing may be classified into one of a rolling bearing and a sliding bearing. In general, the rolling bearing is used in case of a relatively low load, while the sliding bearing is used in case of a high load where the rolling bearing cannot be used. However, the energy loss due to the sliding bearing is greater than that due the rolling bearing.

By the application of the device 1 to the rotating shaft 2, the rolling bearing and the sliding bearing can endure a higher load as compared with the case that the device 1 is not applied. Further, if the load is fixed, a longer life of the radial bearing can be expected.

The device 1 may be provided at a suitable position in the axial direction of the rotating shaft 2, that is, the axial position is not limited. For example, in the case that the fluid is oil, the device 1 may be provided at a shaft sealing portion of the rotating shaft 2. In this case, as a hydraulic pressure is applied to the shaft sealing portion to be sealed, a shaft sealing effect can also be improved.

Figure 2:
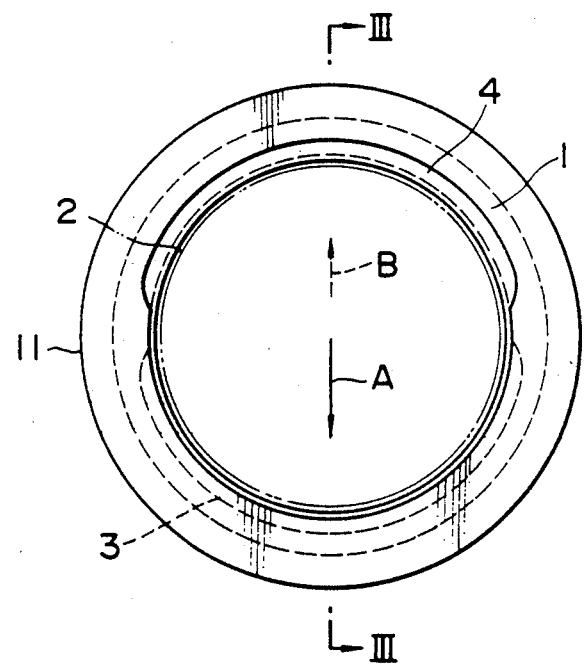
FIG. 2 is an elevational view of the sliding bearing according to the second feature of the invention.
Figure 3:
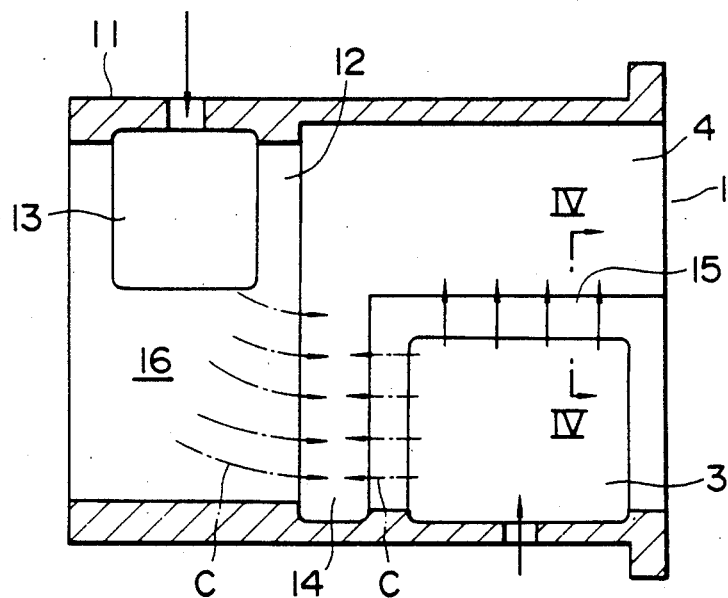
FIG. 3 is a cross section taken along the line III—III in FIG. 2.
Figure 4:
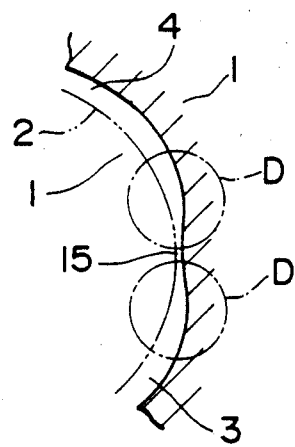
FIG. 4 is a partial cross section taken along the line IV—IV in FIG. 3.

FIGS. 2 to 4 show a sliding bearing 11 according to the second aspect of the invention. The sliding bearing 11 is formed by employing the device 1 according to the first aspect of the invention. As shown in FIG. 2, a radial load is applied to the rotating shaft 2 in a direction depicted by a solid arrow A, and the high-pressure fluid chamber 3 of the device 1 is defined on the side indicated by the arrow A, while the low-pressure fluid chamber 4 is defined on the opposite side of the high-pressure fluid chamber 3. An oil groove 13 for storing a lubricating oil is formed on the opposite side of the low-pressure fluid chamber 4 with respect to a wall portion 12.

The low-pressure fluid chamber 4 is provided with an extending portion 14 for allowing the oil in the oil groove 13 and the high-pressure fluid chamber 3 to flow as shown by arrows C in FIG. 3.

With this construction, there is generated a force in a direction as depicted by a dotted arrow B in FIG. 2 counter to the direction A of application of the radial load to be applied to the rotating shaft 2, thereby reducing the radial load to be applied to the bearing 11.

It is preferable that a first gap between the rotating shaft 2 and a boundary portion 15 between the high-pressure fluid chamber 3 and the low-pressure fluid chamber 4 should be greater than a gap between the rotating shaft 2 and an inner circumferential portion 16 of the extending portion 14 on the oil groove 13 side, so as to avoid the load from being applied to the boundary portion 15.

Further, it is preferable that the circumferentially opposite ends of the first gap at 15 as shown by circles D of dashed lines in FIG. 4, should be formed into a wedge shape so as to generate a hydraulic pressure.

Figure 5:
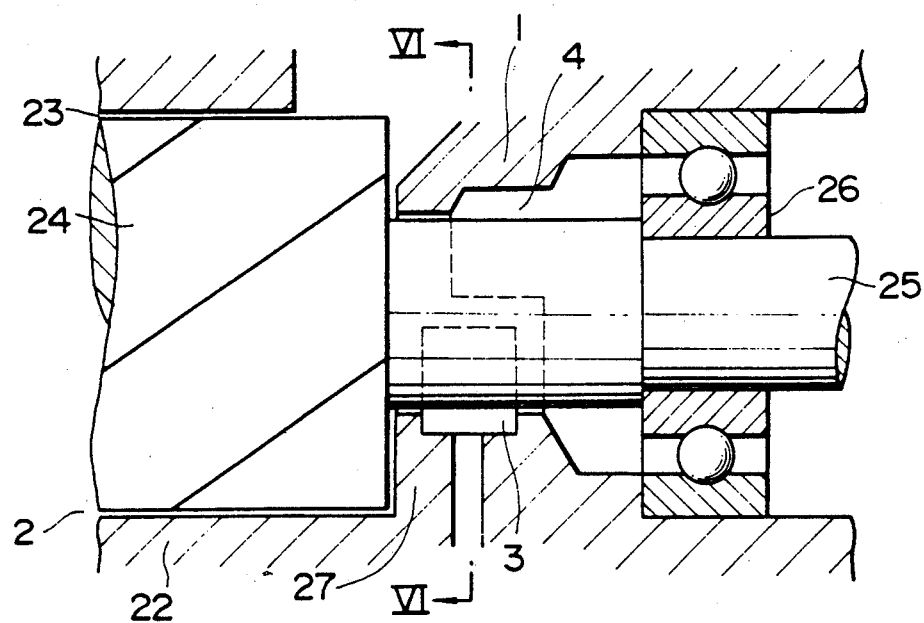
FIG. 5 is a sectional view of a part of the screw compressor according to the third feature of the invention.
Figure 6:
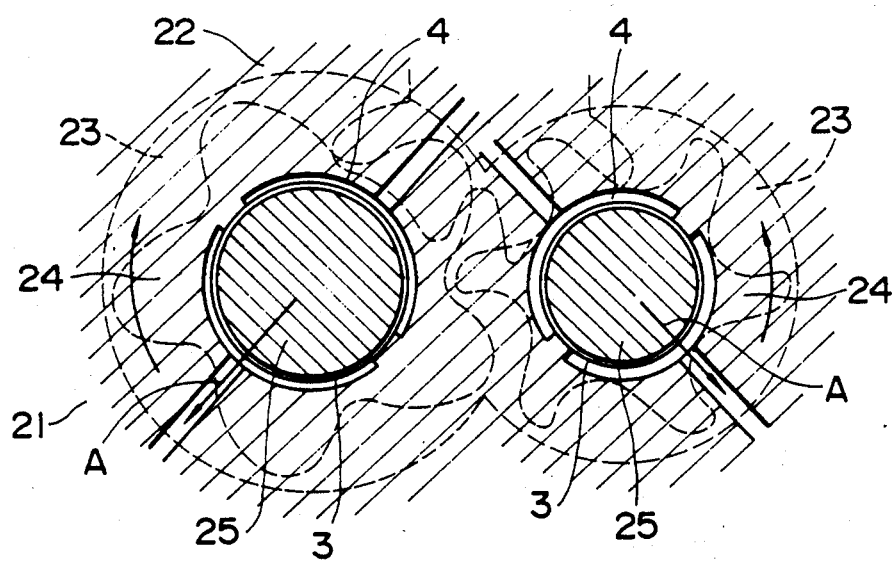
FIG. 6 is a cross section taken along the line VI—VI in FIG. 5.

FIGS. 5 and 6 show a screw compressor according to the third aspect of the invention, wherein a pair of female and male screw rotors 24 meshing with each other are accommodated in a rotor chamber 23 of a casing 22, and a pair of rotor shafts 25 for the screw rotors 24 are rotatably supported by radial bearings 26. Further, the device 1 according to the first invention is applied to a shaft sealing portion 27 formed between the screw rotors 24 and the bearings 26. As shown in FIG. 6, the screw rotors 24 received radial loads in the directions as depicted by solid arrows A from a compressed gas during operation. Accordingly, the high-pressure fluid chamber 3 of the device 1 is defined on the side indicated by the arrows A, and the low-pressure fluid chambers 4 of the device 1 are defined on the opposite side of the high-pressure fluid chambers 3.

Thus, the radial loads to be applied to the radial bearings 26 can be reduced by providing the device 1 as mentioned above. Further, as the device 1 is used at the shaft sealing portion 27, a shaft sealing effect can be further improved as previously mentioned.

Figure 7:
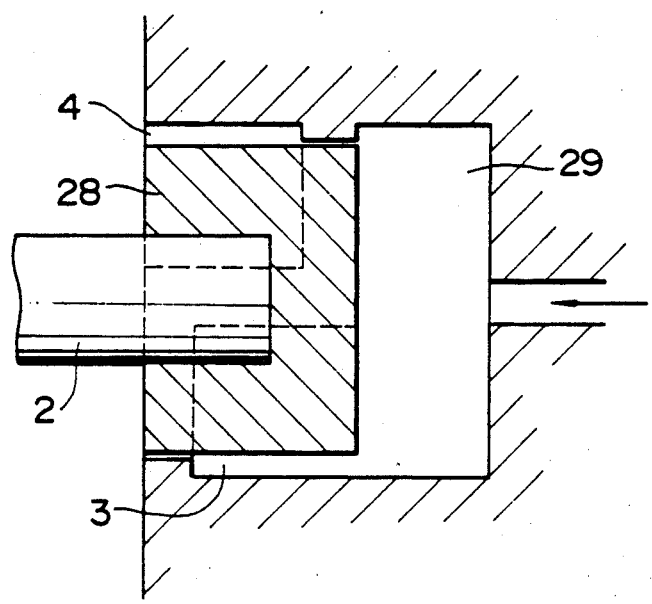
FIG. 7 is a sectional view of a part of another embodiment according to the third feature of the invention.

The third aspect of the invention should not be limited to the above preferred embodiment but may include a compressor as shown in FIG. 7 wherein the device 1 is provided at the end of the rotor shaft 2.

More specifically, a piston 28 is provided at the end of the rotor shaft 2, and the high-pressure fluid chamber 3 of the device 1 is defined at the outer circumference of the piston 28 on the side where the radial load is applied, while the low-pressure fluid chamber 4 of the device 1 is defined on the opposite side of the high-pressure fluid chamber 3. Further, another high-pressure fluid chamber 29 is defined on a right-hand side of the piston 28 as viewed in FIG. 7, so that a thrust load as well as the radial load to be applied through the piston 28 to the rotor shaft 2 can be reduced.

As described above, the radial load reducing device according to the invention comprises a high-pressure fluid chamber defined to face an outer circumferential portion of a rotating shaft or an outer circumferential portion of a rotating body integrally rotating with said rotating shaft at a first position where a radial load to be applied to said rotating shaft is directed, and a low-pressure fluid chamber defined to face said outer circumferential portion at a second position opposite to said first position.

With this construction, the radial load to be applied to the rotating shaft can be reduced to thereby expand an applicable load range to be endured by a bearing and extend the life of the bearing.

According to the invention, a sliding bearing is formed by using the device according to the invention. Accordingly, an upper limit of the radial load to be applied to the rotating shaft supported by the sliding bearing can be increased. Otherwise, the life of the bearing can be extended if the radial load is fixed.

According to the invention, a screw compressor is formed by using the device according to the invention. Accordingly, the compressor may be operated under a higher pressure owing to the extension of the life of the bearing and the expansion of the applicable load range.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A radial load reducing device comprising:
a stationary housing;
a rotating element rotatably mounted in said stationary housing;
a high pressure fluid chamber filled with a high pressure fluid and defined between an outer circumferential portion of said rotating element and said stationary housing; and
a low pressure fluid chamber filled with a fluid having a pressure lower than that of said high pressure fluid and defined between said outer circumferential portion of said rotating element and said stationary housing at a location axially aligned with, and radially opposite to, said high pressure fluid chamber.

2. The device of claim 1, wherein said rotating element is a rotary shaft.

3. The device of claim 5, wherein said rotating element includes a body which rotates integrally with a rotary shaft.

4. The device of claim 3, wherein said stationary housing is a housing of a screw compressor and said rotating element is a screw shaft.

5. The device of claim 4, including bearing means for rotatably mounting said screw shaft in said housing, wherein said high and low pressure fluid chambers are positioned between said bearing means and a screw rotor of said screw shaft, and comprise a shaft seal.

6. The device of claim 2, wherein said low pressure fluid chamber includes an extending portion which extends circumferentially so as to be radially aligned with, and axially offset from, said high pressure fluid chamber.

7. The device of claim 6, including an oil groove fluidically coupled with said extending portion.

8. The device of claim 7, wherein a first gap between said rotating element and a boundary portion between said high pressure fluid chamber and said low pressure fluid chamber is greater than a gap between said rotating element and a portion between said oil groove and said extending portion.

9. The device of claim 8, wherein circumferentially opposite ends of said first gap are wedge shaped.

* * * * *